July 11, 1939. H. A. ORTEGREN 2,165,571

CUTTING TOOL AND HOLDER

Filed Jan. 12, 1938

Inventor
Herman A. Ortegren,
By
Attorneys

Patented July 11, 1939

2,165,571

UNITED STATES PATENT OFFICE 2,165,571

CUTTING TOOL AND HOLDER

Herman A. Ortegren, Detroit, Mich., assignor to Bower Roller Bearing Company, Detroit, Mich., a corporation of Michigan Application January 12, 1938, Serial No. 184,625

10 Claims. (Cl. 29—96)

This invention relates to tools and tool holders and has for its primary object to provide a blade or cutter and a support therefor whereby it is adapted for use in conjunction with automatic screw machines, lathes, and the like.

An important object of the invention is to provide a tool and a holder for rigidly supporting the same, the tool being removable from the holder for grinding and replacement. To provide for rigidity in the mounting of the tool, and arcuate positioning of the tool relative to the holder, the tool is provided with opposed diverging surfaces, whereby it incorporates the characteristics of a wedge, and the holder has opposed pressure creating elements which bear against the diverging tool surfaces whereby any tendency for movement of the tool relative to the holder is confined to a single direction. The tool holder has a resting surface and the tool has a co-operating abutting surface. The tendency for movement, as mentioned above, results in firm contact between the resting surface and the abutting surface, which, in turn, causes accurate positioning of the tool in the holder.

Another object of the invention is to provide a tool holder wherein the cutting end of the tool mounted therein may be shifted to different horizontal planes by lengthwise movement thereof. To this end the tool is supported in an inclined position whereby movement of the tool in the direction of its length elevates or lowers the cutting end.

Another object of the invention is to provide a tool holder wherein the tool may be adjustably moved vertically and means in conjunction therewith for maintaining lengthwise adjustment of the tool during such vertical adjustment.

Other objects, which will become apparent as the description progresses, relate to the structure of the tool clamping elements and the means cooperating therewith in insuring proper disposition of the blade, as well as an efficient holding action.

In the accompanying drawing.

Like characters of reference are employed throughout to designate corresponding parts.

Figure 2:
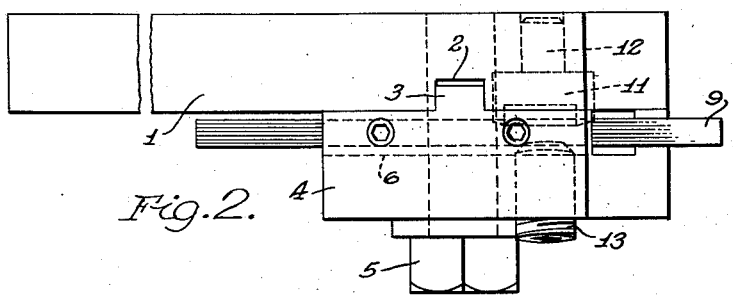
Fig. 2 is a plan.
Figure 1:
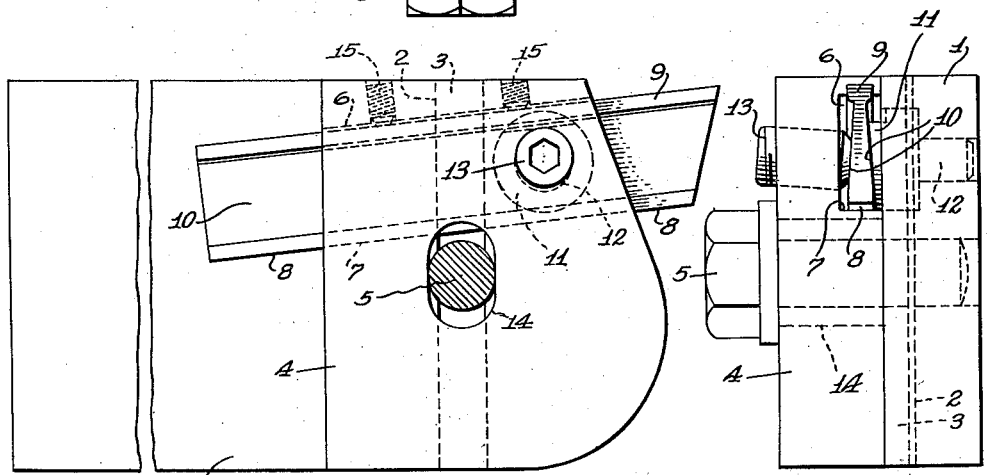
Figure 1 is a side elevation of the tool and holder.
Figure 3:
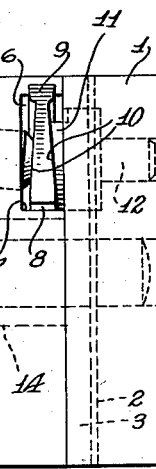
Fig. 3 is a front elevation.
Figure 5:
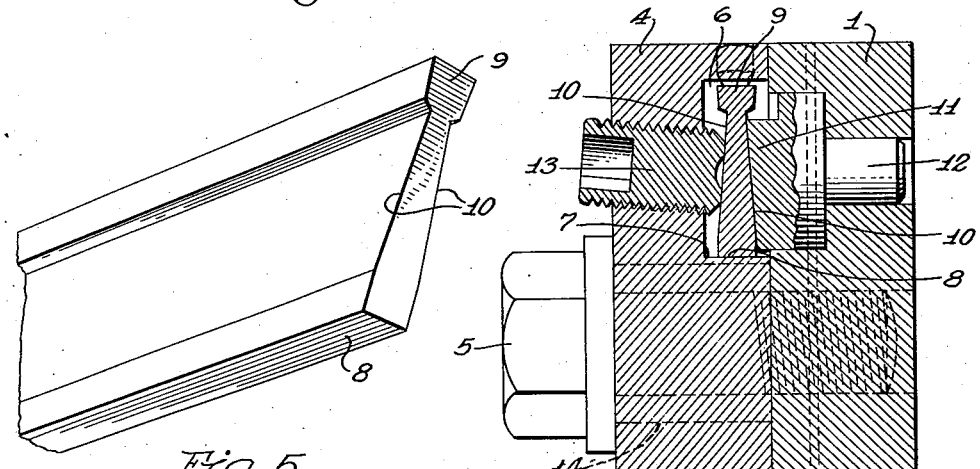
Fig. 5 is a fragmental perspective of the tool.
Figure 4:
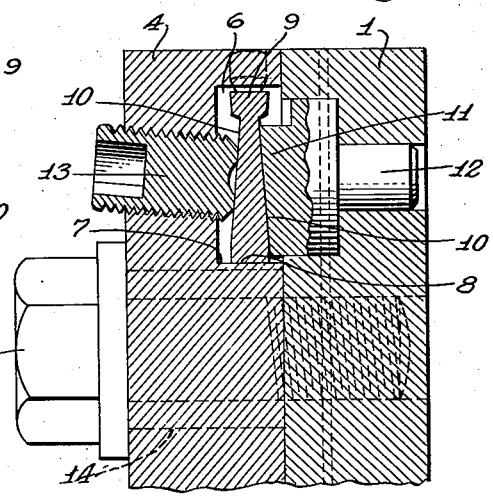
Fig. 4 is a transverse cross section.

The main plate 1 represents that part of the tool holder which is mounted in suitable receiving and supporting apparatus in an automatic screw machine or lathe, and inasmuch as this structure forms no part of the invention it is not illustrated here. The plate 1 is ordinarily supported in the horizontal position shown in Fig. 1 and its position has a definite relationship with the work supporting apparatus, and therefore accurate positioning of a cutter relative to the plate results in proper positioning of the cutter with the work supporting elements of the automatic machine or lathe, as the case may be.

The plate 1 is formed with an accurately positioned vertical groove 2 into which projects a tongue 3 on a block 4 and the block 4 is secured to the plate 1 by a bolt 5, the complemental tongue and groove formation serving to accurately position the block relative to the plate. The face of the block 4 which abuts the plate 1 has a groove 6 therein and inclined relative to a horizontal plane. The lower wall 7 of the groove is accurately machined and constitutes a resting surface which cooperates with an abutting surface 8 on a cutter 9. That is, the surface 8 of the cutter rests upon the surface 7, and engagement of these surfaces results in definite positioning of the blade as to its angularity.

The cutter 9 is formed with a wedge shaped portion 10, one side of which engages a cutter positioning element 11 having an inclined surface corresponding to the inclination of the adjacent cutter wall. The positioning element 11 is in the form of an insert and comprises a head portion and a stem portion 12 having a pressed fit in suitable bores in the plate 1. In the event this element becomes damaged it may be removed, but under ordinary circumstances it is immovable.

Mounted in the block 4 is a clamping screw 13, its axis being perpendicular to the adjacent face of the cutter 9. When the screw 13 is tightened into engagement with the cutter, the wedge like portion thereof is subjected to pressure tending to move the cutter downwardly and such tendency insures firm contact between the surfaces 7 and 8. The cutter 9 is thus accurately positioned relative to the plate 1 and due to the relationship of the angular sides of the cutter with the positioning element and clamping screw it is impossible for the cutter to move from contact with the surface 7 when its projecting point is subjected to pressure.

Due to the inclination of the cutter, lengthwise movement thereof results in elevation or lowering of the cutting point, and such movement may take place when the screw 13 is loosened. The cutter may be readily removed and replaced, and during replacement of the cutter proper positioning of the cutter is insured by the clamping elements which function to cause firm contact between the resting and abutting surfaces.

In order to permit vertical adjustment of the tool without disturbing its lengthwise adjustment, the block 4 is provided with a vertical slot 14 through which the bolt 5 extends. By loosening the bolt 5 and the clamping element 13 the block may be shifted vertically relative to the main plate 1. Because such an adjustment necessitates loosening of the tool clamping means, clamping screws 15 are mounted in the block 4 and are tightened against the tool. The clamping screws 15, when tightened, hold the tool against lengthwise movement while the block is being vertically adjusted.

Although a specific embodiment of the invention has been illustrated and described, it will be understood that various changes may be made within the scope of the appended claims without departing from the spirit of the invention, and such changes are contemplated.

What I claim is:

1. In combination, a tool having an abutting surface and a tool holder having a resting surface adapted when engaged to locate the tool relative to the holder, said tool having one side extending obliquely relative to its abutting surface, said holder having a bearing surface extending obliquely relative to its resting surface, and a clamping element carried by said holder and engaging the other side of said tool and exerting pressure to cause engagement between said oblique surfaces, said oblique surfaces being disposed whereby they function in the presence of pressure exerted by said clamping element to force said resting and abutting surfaces into firm contact.

2. In combination, a tool having an abutting surface and a tool holder having a resting surface adapted when engaged to locate the tool relative to the holder, said tool having diverging surfaces at opposite sides thereof, said holder having an inclined surface engaging one of the diverging surfaces of the tool, and a clamping element engaging the other diverging surface of the tool, said inclined surface and diverging surfaces and clamping element cooperating whereby they press said resting and abutting surfaces together in the presence of pressure exerted by said clamping element.

3. In combination, a plate, an inclined bearing surface on said plate, a grooved block secured to said plate with the groove therein opposite said bearing surface, the bottom wall of said groove constituting a resting surface, a tool having an inclined surface, said tool being disposed in said groove with its inclined surface engageable with said bearing surface, and a clamping element in said block and extending into said groove, said clamping element engaging said tool to cause engagement of the inclined tool surface and bearing surface whereby the latter cause firm engagement between said tool and resting surface.

4. In combination, a plate, an inclined bearing surface on said plate, a grooved block secured to said plate with the groove therein opposite said bearing surface, the bottom wall of said groove constituting a resting surface, a tool of wedge-shaped section, said tool being disposed in said groove with one wedge-like side hereof in engagement with said inclined bearing surface, and a clamping element engaging the other wedge-like side of said tool for exerting pressure in cooperation with said bearing surface for wedging the tool in a direction causing engagement thereof with said resting surface.

5. In combination, a tool holder comprised of a pair of relatively movable parts, means securing said parts together whereby they may be adjustably moved relative to each other, means for the reception of a tool having the characteristics of a wedge, a tool locating means on one part, means on said parts for cooperating with a tool having wedge characters for clamping the tool and for causing firm contact thereof with said locating means, said last named means being inoperative during adjustment movement of said parts, and means for maintaining contact between the tool and said locating means during adjustment movement of said parts.

6. In combination, a support, an inclined bearing surface on said support, a grooved block, means securing said block to said support for adjustable movement relative thereto and with the groove therein opposite said inclined bearing surface, one side wall of said groove comprising a tool locating surface, a tool having an inclined surface, said tool being disposed in said groove with its inclined surface engageable with said bearing surface, a clamping element in said block and extending into said groove, said clamping element engaging said tool to cause engagement of the inclined tool surface and bearing surface whereby the latter cause firm engagement between the tool and locating surface, said clamping element being inoperative during adjustable movement of the block, and means for clamping said tool against said locating surface when said clamping element is inoperative.

7. In combination, a support, an inclined bearing surface on said support, a grooved block, means securing said block to said support for adjustable movement relative thereto and with the groove opposite said inclined surface, one side wall of said groove comprising a locating surface, a tool of wedge-shaped section, said tool being disposed in said groove with one wedge-like side thereof in engagement with said inclined bearing surface, a clamping element engaging the other wedge-like side of said tool for exerting pressure in cooperation with said bearing surface for wedging the tool in a direction causing engagement thereof with said locating surface, said clamping element being inoperative during adjustable movement of said block, and means for holding the tool relative to said locating surface during adjustment of the block.

8. In combination, a plate, an inclined bearing surface on said plate, a grooved block, means securing said block to said plate whereby the block may be moved adjustably relative to the plate and with the groove therein opposite said bearing surface, the bottom wall of said groove constituting a resting surface, a tool having an inclined surface, said tool being disposed in said groove with its inclined surface engageable with said bearing surface, and a clamping element in said block and extending into said groove, said clamping element engaging said tool to cause engagement of the inclined tool surface and bearing surface whereby the latter cause firm engagement between said tool and resting surface.

9. In combination, a plate, an inclined bearing surface on said plate, a grooved block, means securing said block to said plate whereby the block may be moved adjustably relative to the plate and with the groove therein opposite said bearing surface, the bottom wall of said groove constituting a resting surface, a tool of wedge-shaped section, said tool being disposed in said groove with one wedge-like side thereof in engagement with said inclined bearing surface, and a clamping element engaging the other wedge-like side of said tool for exerting pressure in cooperation with said bearing surface for wedging the tool in a direction causing engagement thereof with said resting surface.

10. In a tool holder, a main body member, a block, means for selectively adjusting the relative position of said main body member and said block, tool locating means in said block, and tool clamping means in said main body member and in said block cooperable for clamping a tool downwardly against said tool locating means.

HERMAN A. ORTEGREN.